United States Patent
Zhang (10) Patent No.: US 11,126,822 B2
(45) Date of Patent: Sep. 21, 2021

(54) METHOD AND APPARATUS FOR OBTAINING PAINTING

(71) Applicant: BOE TECHNOLOGY GROUP CO., LTD., Beijing (CN)

(72) Inventor: Shaonan Zhang, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 186 days.

(21) Appl. No.: 16/550,593

(22) Filed: Aug. 26, 2019

(65) Prior Publication Data

US 2020/0074149 A1 Mar. 5, 2020

(30) Foreign Application Priority Data

Aug. 28, 2018 (CN) .......................... 201810986895.9

(51) Int. Cl.
- *G06K 9/00* (2006.01)
- *G06F 3/01* (2006.01)
- *G06T 7/11* (2017.01)
- *G06N 3/08* (2006.01)

(52) U.S. Cl.
CPC ......... *G06K 9/00255* (2013.01); *G06F 3/013* (2013.01); *G06K 9/0061* (2013.01); *G06K 9/00604* (2013.01); *G06N 3/08* (2013.01); *G06T 7/11* (2017.01)

(58) Field of Classification Search
CPC ............... G06K 9/4628; G06K 9/0061; G06K 9/00604; G06K 9/6271; G06K 9/00255; G06T 7/11; G06N 3/08; G06F 3/013
See application file for complete search history.

(56) References Cited

U.S. PATENT DOCUMENTS

| 2015/0131850 | A1  | 5/2015 | Qvarfordt |
| 2017/0031437 | A1* | 2/2017 | Qian ....................... G06T 7/277 |

FOREIGN PATENT DOCUMENTS

| CN | 104951084 A | 9/2015 |
| CN | 105989045 A | 10/2016 |
| CN | 106557937 A | 4/2017 |
| CN | 108255299 A | 7/2018 |

(Continued)

OTHER PUBLICATIONS

Damala, Areti, and Nenad Stojanovic. "Tailoring the Adaptive Augmented Reality (A 2 R) museum visit: Identifying Cultural Heritage professionals' motivations and needs." 2012 IEEE international symposium on mixed and augmented reality-arts, media, and humanities (ISMAR-AMH). IEEE, 2012. (Year: 2012).*

(Continued)

*Primary Examiner* — Vu Le
*Assistant Examiner* — Tracy Mangialaschi
(74) *Attorney, Agent, or Firm* — Myers Bigel, P.A.

(57) ABSTRACT

The present disclosure provides a method and apparatus for obtaining a painting. The method includes receiving an acquired face image of a user who is viewing a current painting, analyzing a received face image to determine a target region on the current painting that the user is gazing, and obtaining at least one associated painting associated with the target region. According to the present disclosure, paintings are recommended according to the user's current preference, accuracy of painting recommendation is increased, and then the user experience is improved.

20 Claims, 3 Drawing Sheets

(56) References Cited

FOREIGN PATENT DOCUMENTS

CN      108446943 A  *  8/2018
CN      108446943 A     8/2018

OTHER PUBLICATIONS

Mokatren, Moayad, Tsvi Kuflik, and I. Shimshoni. "Exploring the Potential Contribution of Mobile Eye-tracking Technology in Enhancing the Museum Visit Experience." AVI Ch. 2016. (Year: 2016).*
"First Office Action and English language translation", CN Application No. 201810986895.9, dated Sep. 27, 2020, 15 pp.

* cited by examiner

METHOD AND APPARATUS FOR OBTAINING PAINTING

CROSS REFERENCE TO RELATED APPLICATION

The present application claims the benefit of Chinese Patent Application No. 201810986895.9, filed on Aug. 28, 2018, the entire disclosure of which is incorporated herein by reference.

FIELD

The present disclosure relates to the technical field of computer processing, and particularly to a method and apparatus for obtaining a painting.

BACKGROUND

Personalized recommendation is being applied more and more widely, and may help users to find products or points that the users might be interested in according to different behavioral characteristics of different users. The existing painting recommendation methods relate to recommending paintings by determining a type of user-preferred paintings based on the users' historical behaviors or paintings selected by the users on their own.

Such painting recommendation methods all recommend paintings according to the users' past preferences, without considering factors such as changes in the users' interest and hobbies, which result in inaccurate recommendation results and poor user experience.

SUMMARY

According to a first aspect, embodiments of the present disclosure provide a method for obtaining a painting. The method includes: receiving an acquired face image of a user who is viewing a current painting; analyzing a received face image to determine a target region on the current painting that the user is gazing at; and obtaining at least one associated painting associated with the target region.

In some embodiments, the analyzing the received face image includes analyzing the face image based on a trained neural network model, and before determining the target region on the current painting that the user is gazing at, the method further includes: dividing a sample painting into at least one region; receiving a plurality of acquired sample face images of a plurality of sample users who gaze at the regions; obtaining distance information of the sample users relative to the current painting that corresponds to respective sample face images; segmenting corresponding eye images including pupil information from the sample face images; and training the neural network model by using the distance information and the eye images corresponding to respective sample face images to obtain a trained neural network model.

In some embodiments, the current painting is divided into at least one region, and before obtaining at least one associated painting associated with the target region, the method further includes: recognizing at least one target feature in each region; and adding annotation information for respective target features.

In some embodiments, the obtaining at least one associated painting associated with the target region includes: retrieving, according to annotation information of the target features in the target region, at least one associated painting corresponding to the annotation information from a painting database.

In some embodiments, before obtaining at least one associated painting associated with the target region, the method further includes: determining a duration during which the user gazes at the target region; and sending an instruction to obtain the at least one associated painting associated with the target region in response to the duration being greater than a threshold duration.

In some embodiments, the determining a duration during which the user gazes at the target region includes: acquiring a sequence of face images of the user who is viewing the current painting at a regular time interval, and determining the duration during which the user gazes at the target region according to the sequence of face images.

In some embodiments, the at least one associated painting that is obtained is recommended to the user in a user-perceptible manner.

In some embodiments, the face images include two face images simultaneously captured by a binocular camera, and the distance information is obtained by calculating a parallax of the two face images.

According to a second aspect, embodiments of the present disclosure provide an apparatus for obtaining a painting. The apparatus includes an image acquirer, a target region determiner and an associated painting obtainer. The image acquirer is configured to acquire a face image of a user who is viewing a current painting. The target region determiner is configured to receive and analyze the face image to determine a target region on the current painting that the user is gazing at. The associated painting obtainer is configured to obtain at least one associated painting associated with the target region.

In some embodiments, the apparatus further includes a region divider configured to divide the current painting into at least one region. The image acquirer is configured to acquire a plurality of sample face images of a plurality of sample users who gaze at the regions. The target region determiner is configured to analyze a received face images based on a trained neural network model, wherein the plurality of sample face images are used as training data to train the neural network model in such a way that distance information of the sample users relative to the current painting that corresponds to respective sample face images is obtained, eye images including pupil information are segmented from the sample face images, and the neural network model is trained by using the distance information and the eye images corresponding to respective sample face images to obtain the trained neural network model.

In some embodiments, the apparatus further includes a region divider configured to divide the current painting into at least one region; a target feature recognizer configured to recognize at least one target feature in each region; and an annotation information adder configured to add annotation information for respective target features.

In some embodiments, the associated painting obtainer is configured to retrieve, according to the annotation information of the target features in the target region, at least one associated painting associated with the target region from a painting database.

In some embodiments, the apparatus further includes a gaze duration determiner configured to determine a duration during which the user gazes at the target region; and send an instruction to initiate the associated painting obtainer to obtain at least one associated painting associated with the target region in response to the duration being greater than a threshold duration.

In some embodiments, the apparatus further includes a gaze duration determiner configured to receive from the image acquirer a sequence of face images of the user who is viewing the current painting acquired at a regular time interval, and determine the duration during which the user gazes at the target region according to the sequence of face images.

In some embodiments, the apparatus further includes a recommender configured to recommend the at least one associated painting that is obtained to the user in a user-perceptible manner.

In some embodiments, the image acquirer is a binocular camera configured to capture two face images simultaneously, and the target region determiner is configured to obtain the distance information by calculating a parallax of the two face images.

According to a third aspect, embodiments of the present disclosure provide a computer-readable storage medium on which a computer program is stored, the computer program, when executed by a processor, causes the processor to implement steps of the method according to embodiments of the present disclosure in the first aspect.

According to a fourth aspect, embodiments of the present disclosure provide a computer device including a memory, a processor and a computer program stored on the memory and being runnable on the processor, wherein the processor, upon executing the computer program, implements steps of the method according to embodiments of the present disclosure in the first aspect.

BRIEF DESCRIPTION OF THE DRAWINGS

The present disclosure will be further described in detail below in conjunction with specific embodiments and with reference to figures to make the above objects, features and advantages of the present disclosure more apparent. In the figures.

DETAILED DESCRIPTION

In the following description, certain specific details of the disclosed embodiment such as architecture, interfaces and techniques, etc., are set forth for purposes of explanation rather than limitation, so as to provide a clear and thorough understanding of the present disclosure. However, it should be understood readily by those skilled in this art, that the present disclosure may be practiced in other embodiments which do not conform exactly to the details set forth herein, without departing significantly from the spirit and scope of this disclosure. Further, in this context, and for the purpose of brevity and clarity, detailed descriptions of well-known apparatus, circuits and methodology have been omitted so as to avoid unnecessary detail and possible confusion.

Figure 1:
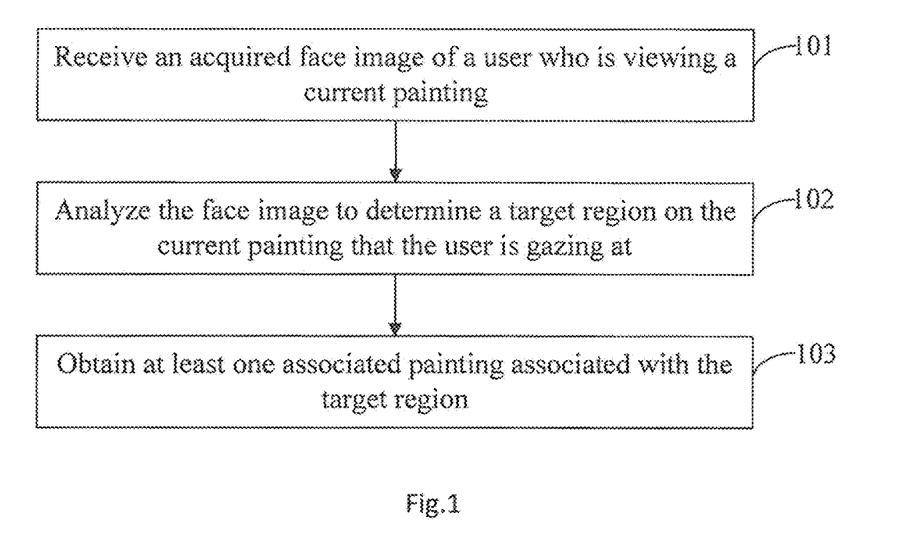
FIG. 1 is a flowchart of a method for obtaining a painting according to an embodiment of the present disclosure.

FIG. 1 is a flowchart of a method for obtaining a painting according to an embodiment of the present disclosure.

In step 101, an acquired face image of a user who is viewing a current painting is received.

In an embodiment of the present disclosure, the face image acquired in real time may be received from an image acquirer. Alternatively or additionally, the user's face image may be retrieved from a picture database.

The image acquirer may be pre-installed on the current painting. The image acquirer may be, for example, a camera, and optionally a high-definition binocular camera. For example, the current painting may be a picture displayed in a digital art frame, whereby a high-definition binocular camera or the like may be installed on the digital art frame. The user's face image may be captured in real time by the camera. Exemplarily, the binocular camera may be installed at a central position above the digital art frame, or the binocular camera may be installed at other suitable positions as long as the camera may photograph the user's face. In one example, referring to FIG. 2, the binocular high-definition camera 1 is placed exactly above the picture frame. It may be understood that an installation position of the image acquirer is not limited thereto according to an embodiment of the present disclosure.

In step 102, a received face image is analyzed to determine a target region on the current painting that the user is gazing at.

Figure 2:
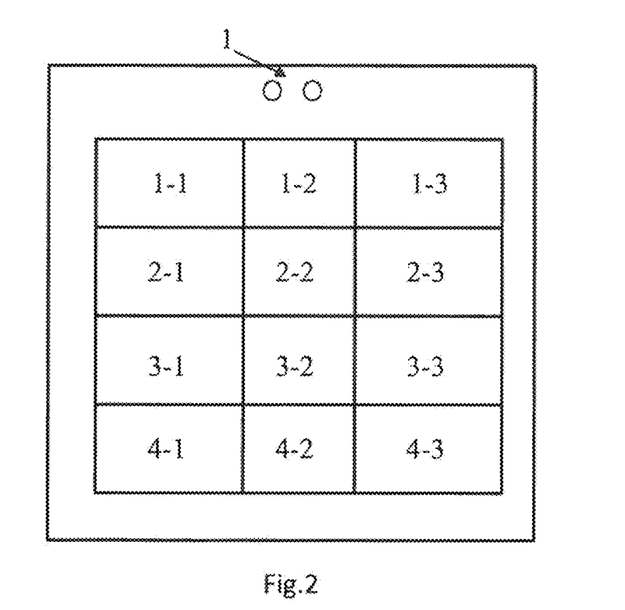
FIG. 2 is a schematic diagram showing a region division of a current painting according to an embodiment of the present disclosure.

In an embodiment of the present disclosure, the current painting is pre-divided into a plurality of regions. For example, FIG. 2 shows a schematic diagram showing a region division of the current painting according to an embodiment of the present disclosure. As shown in FIG. 2, the current painting is pre-divided into 3*4 regions. Each of the divided regions may be designated in advance. For example, as shown in FIG. 2, the 12 regions resulting from the division may be sequentially designated in the row/column order: 1-1, 1-2, 1-3, 2-1, . . . , 4-3, thereby facilitating identification of individual divided regions by the system. Certainly, the manner of designating regions according to the embodiment of the present disclosure is not limited thereto, and in some embodiments, the respective divided regions may also be designated by using uppercase letters (such as A, B, C, etc.) or characters.

In some embodiments, a received face image of the user may be analyzed through a preset and trained neural network model to determine a region, namely, a target region on the current painting that the user's eyes are gazing at.

In some embodiments, before analysis is performed for the face image, training data may be used to train the neural network model to optimize network parameters of the neural network model.

Figure 3:
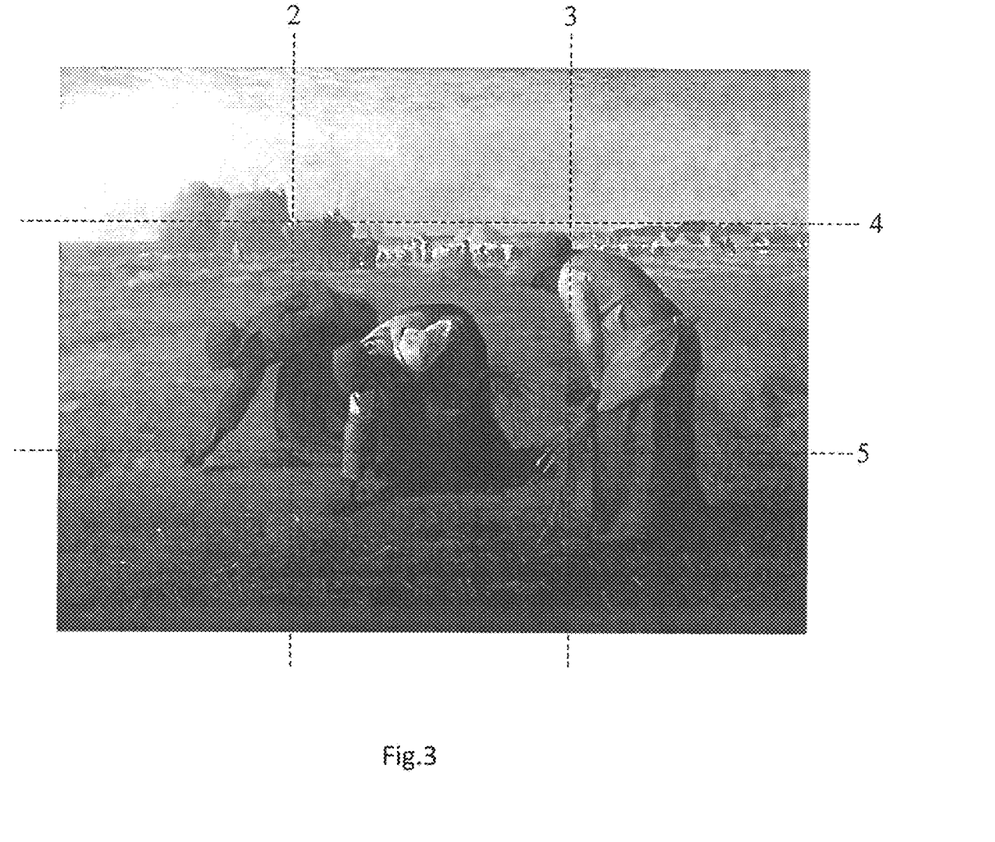
FIG. 3 is a schematic diagram showing a region division of a current painting according to another embodiment of the present disclosure.

In step S1, a sample painting is divided to obtain at least one divided region. The sample painting may include the current painting, or other paintings than the current painting, as long as the shape and size thereof are substantially the same. For example, referring to FIG. 3, the painting "the Gleaners" may be taken as a sample painting. As shown in FIG. 3, the painting "the Gleaners" may be divided into regions by using a dotted line 2, a dotted line 3, a dotted line 4 and a dotted line 5, and then the painting is divided into nine regions. It may be understood that the present disclosure is not limited thereto. Instead, in practical applications, those skilled in the art may select a manner of dividing the sample painting according to actual needs, including the number of divided regions, the size of the divided regions, and the shape of the divided regions.

In step S2, a plurality of sample face images of a plurality of sample users acquired when they are gazing at regions of the sample painting are received. In the embodiment of the present disclosure, a plurality of sample face images of different sample users may be acquired by an image acquirer disposed on the sample painting when these sample users are gazing at the divided regions at different positions. For example, the sample users A, B, and C may gaze at regions a, b, and c at positions 1, 2, and 3, respectively. Thereby, a first sample face image of the user A when gazing at region a at position 1 may be acquired, a second sample face image of the user B when gazing at region b at position 2 may be acquired, and a third sample face image of the user C when gazing at region c at position 3 may be acquired, and so on. It may be appreciated that the above examples are merely examples for better understanding of the technical solutions of embodiments of the present disclosure, and embodiments of the present disclosure are not limited thereto.

In step S3, distance information of the sample users relative to the current painting that corresponds to respective sample face images is obtained. The distance information may indicate for example a distance between the user's eyes and a corresponding region that the user is gazing at.

In an example, after the plurality of sample face images are acquired by using a binocular camera, the distance between the users and the respective regions that the users are gazing at may be obtained according to respective sample face images by means of a ranging function of the binocular camera. In an embodiment of the present disclosure, the binocular camera may photograph at a certain time interval when a sample user is viewing a specific region of the sample painting. As for each photographed sample face image, the distance between the camera (namely, the painting) and the sample user (user's eyes) upon photographing may be obtained by performing calculation of a parallax of two face images captured by the binocular camera. In some embodiments, a height of the user's eyes and a leftward or rightward deviation of the eyes relative to the center of the painting may be obtained through the distance of the eyes in the face image captured by the camera relative to the center of the image. The position information of the sample user may be obtained according to the obtained distance between the camera and the user's eyes, the height of the eyes and the leftward or rightward deviation. Exemplarily, the position of the user's eyes may be represented as coordinates E(x, y, z) (representing transverse, longitudinal, and height deviations, respectively).

It may be understood that when the user is gazing at different regions of the painting at the same position, images of his pupil must be different. Therefore, the region gazed by the user may be determined by analyzing the pupil images. Therefore, at step S4, eye images including pupil information, e.g., pupil images, are segmented from the plurality of sample face images.

In an embodiment of the present disclosure, a pupil position may be located in a face image of a respective sample user, and according to this, a pupil image is obtained by segmenting the face image.

Likewise, since different distances between the user and the painting might also cause a change in pupil even if the user is gazing at the same region of the painting, in some embodiments, the distance information is used as an input along with the pupil images for determination of the target region that the user is gazing at.

In step S5, the neural network is trained by using the distance information and the eye images corresponding to respective sample face images to obtain a trained neural network model.

The distance information and the segmented eye image obtained on the basis of each face image may be regarded as training data and input into the neural network model. Network parameters of the neural network model is optimized according to a difference obtained by comparing a region to which an output value of the neural network model is classified and a gazed region that the face image actually correspond to, to achieve the purpose of training the neural network model.

In some embodiments, the user's position information (including for example distance, height and deviation information) and the segmented eye image obtained on the basis of each face image may be regarded as training data to train the neural network model. Thus, the neural network model may be expressed by the following Equation (1):

$$\varphi(x,y,z,I)=a \quad (1)$$

where $\varphi(\ )$ is the neural network model, x, y and z represent coordinates of the eyes, I represents the pupil position information, and a represents the output value of the neural network, which may be classified into a corresponding region (i.e., the target region that the user's eyes are gazing at).

It may be appreciated that the above examples are merely examples for better understanding the technical solutions of the embodiments of the present disclosure. In practical applications, those skilled in the art may also obtain the neural network model in other manners, and the present disclosure does not limit in this regard.

In step 103, at least one associated painting associated with the target region is obtained.

After determining the target region that the user is gazing at, at least one associated painting associated with the target region may be retrieved from the painting database. Specifically, at least one associated painting may be obtained according to features in the target region, such as color, style, and the like.

The solution according to the embodiments of the present disclosure is to personally recommend the associated painting based on the gaze point of the user's eyes, which may record the point of user's interest more accurately and intuitively, and therefore, the obtained associated painting has a high degree of association with the user's real interest. Moreover, since this does not reply on selection through user labelling but uses human-machine interaction behaviors, it is not required to add the user's other behaviors upon collecting user data, so that a better user experience may be achieved.

In an optional embodiment of the present disclosure, before at least one associated painting associated with the target region is obtained, different paintings may be pre-processed to for example extract relevant features. Pre-processing may include performing semantic analysis for the name of a painting to classify the subject of the painting. The pre-processing may further include performing image recognition in different regions of the painting to extract region-related features. Exemplarily, the image may be equally divided into n parts, and target features included in the image region are recognized by using an image recognition technique such as convolutional neural network, and the target features in the region are annotated. The annotation information may include information of an object(s), such as size, location, color and content, for annotating the related features in the region. Considering that there might be unclear and/or abstract objects in a real scene, or there is no complete recognizable object in a certain region, or the image recognition technique fails to effectively identify an object(s) within the painting, correction and optimization may be performed for a recognized object(s) and the regions through the intervention of experts in the field after image recognition is performed. In some embodiments, a corresponding association relationship may also be added to construct a knowledge map.

Annotation of target features in divided regions of the painting may be exemplarily performed in the following manner.

In step S6, at least one target feature in a respective region is recognized;

In step S7, annotation information is added for respective target features.

In the present disclosure, target features may include color features, style features, content features, and so on. The color features may be yellow, black and white, and the like. Style features may be sketches, colorful paintings, and the like. The content features may be mountains, running water, people, and so on.

After the target features in a respective region are recognized, the annotation information may be added for the recognized target features. For example, the annotation information added to a certain image region may be: color-black and white, style-colorful painting, content-running water, and the like.

It may be appreciated that the above examples are merely examples for better understanding of the technical solutions of the embodiments of the present disclosure, and the present disclosure is not limited thereto.

In an optional embodiment of the present disclosure, the step 103 may further include: retrieving, according to the annotation information of the target features in the target region, the at least one associated painting corresponding to the annotation information from the painting database.

In the embodiment of the present disclosure, since the annotation information is added for the target features in regions of the current painting in advance, after a target region that the user is gazing at is determined, at least one associated painting corresponding to the annotation information may be retrieved from a preset database according to the annotation information in the target region. For example, if the annotation information added in the target region is: color-black-and-white, style-colorful painting, scenery-running water, matching between the annotation information and those of pre-saved paintings in the preset database is carried out, thereby obtaining at least one corresponding associated painting.

In some embodiments, a time period during which the user is gazing at the target region may also be determined prior to obtaining the at least one associated painting associated with the target region. When the user gazes at the target region for a long time, indicating that the user is interested in the target region, obtaining of an associated painting may be performed; meanwhile, when the user gazes at the target region for a short time, indicating that the user is not interested in the target region, obtaining of the associated painting is not performed.

In an optional embodiment of the present disclosure, before the step 103, the method may further include:

Step N1: determining a duration during which the user gazes at the target region;

Step N2: determining whether the duration is greater than a threshold duration;

Step N3: when the duration is greater than the threshold duration, performing the step of obtaining the at least one associated painting according to the target region.

In the embodiments of the present disclosure, a plurality of face images of a user may be continuously acquired at a certain time interval. The duration during which the user gazes at the target region, such as 1 min, 3 min, etc., may be determined based on a sequence of successive face images. For example, the region that the user is gazing at may be determined according to face images in the sequence of face images. When the determined region changes, a decision that the user no longer gazes at the region is made. Alternatively, it is also possible to determine that the user no longer gazes at the region by simply analyzing the change in the pupil positions in the face images.

In the embodiment of the present disclosure, any suitable solution for calculating the duration during which the user gazes at the target region according to the face images may be employed.

The threshold duration may be pre-set in the system. The threshold duration may be set to be 1 min, 3 min, etc. according to an observed user's behavior habit, which is not limited in the present disclosure.

When the duration during which the user gazes at the target region is less than or equal to the threshold duration, which usually indicates that the user is not interested in the target region, the step of obtaining at least one painting associated with the target region is no longer performed.

In the embodiment of the present disclosure, after obtaining at least one painting associated with the target region gazed at by the user, the at least one painting may further be recommended to the user in a user-perceivable manner, for example, in an audible or visual manner, so that the user is capable of viewing more paintings that he likes or is interested in, thereby improving the user's satisfaction.

According to the method for obtaining a painting provided by the embodiments of the present disclosure, at least one associated image may be obtained according to a target region on the current painting that a user is gazing at, and recommended to the user. Since the user's gaze may characterize the user's preference or interest, relevant data acquired based on the region gazed at by the user may increase dimensions of user data and significantly optimize the current recommendation algorithm, thereby achieving the purpose of recommending paintings according to the user's current preference. This further increases the accuracy of the painting recommendations and improves the user experience.

Figure 4:
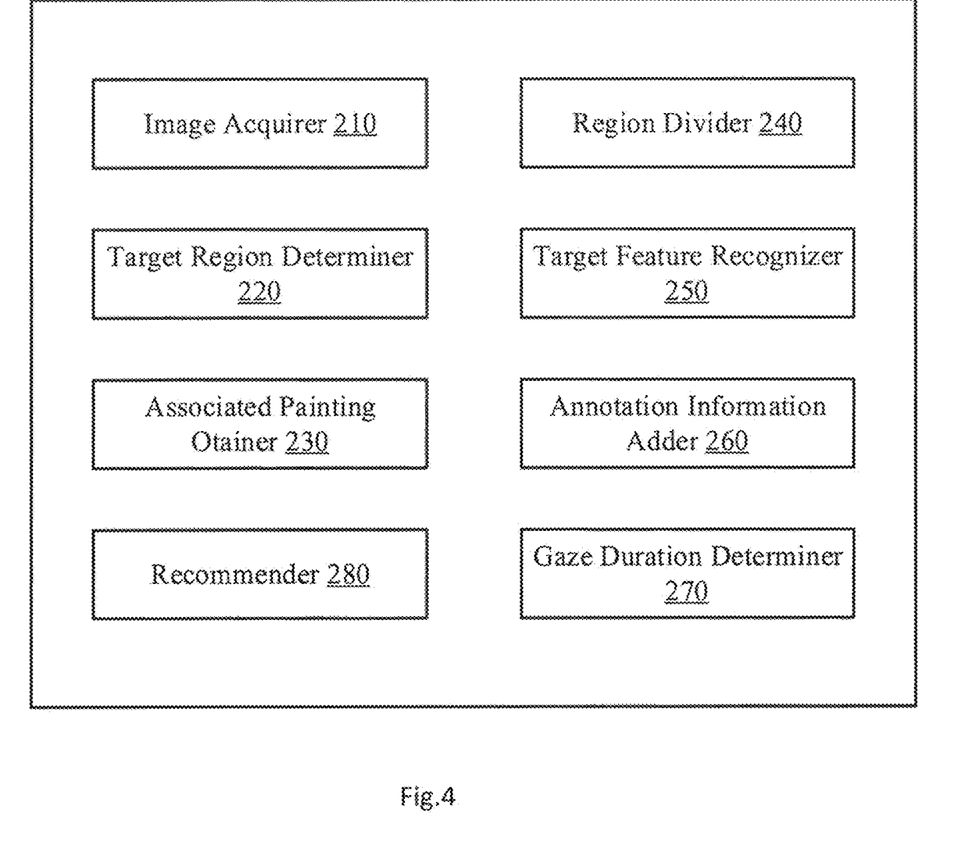
FIG. 4 is a schematic structural diagram of an apparatus for obtaining a painting according to an embodiment of the present disclosure.

FIG. 4 is a schematic structural diagram of an apparatus for obtaining a painting according to an embodiment of the present disclosure. The apparatus for obtaining a painting includes an image acquirer 210, a target region determiner 220, and an associated painting obtainer 230.

The image acquirer 210 is configured to acquire a face image of a user who is viewing a current painting. In some embodiments, the image acquirer 210 may be a camera, optionally a high-definition binocular camera. The image acquirer 210 may be installed at an edge of a frame that displays the current painting. Exemplarily, the image acquirer 210 may be installed at the upper edge of the frame. In some embodiments, the image acquirer 210 may also be installed on a wall on which a picture frame is hung, or at any other position suitable for capturing the face of the user viewing the paining, particularly the user's eyes. In some embodiments, the image acquirer 210 may acquire the user's face image at a specified time interval.

The target region determiner 220 is configured to analyze the acquired face image to determine a target region on the current painting that the user is gazing at. In some embodiments, target region determiner 220 may analyze the face image based on a trained neural network model to determine the target region.

In some embodiments, the apparatus for obtaining a painting further includes a region divider 240 configured to divide the current painting into at least one region. The target region determiner 220 is configured to determine one of the divided regions as the target region.

In some embodiments, during the neural network is trained, the image acquirer 210 is further configured to acquire a plurality of sample face images of a plurality of sample users who gaze at divided regions of the painting. The target region determiner 220 may be configured to train the neural network model by using the plurality of sample face images as training data. In some embodiments, the target region determiner 220 is configured to obtain distance information of the sample users relative to the current painting that corresponds to respective sample face images, and segment eye images including pupil information from the sample face images. The neural network model is trained by using the distance information and the eye images corresponding to respective sample face images to obtain the trained neural network model. The target region determiner 220 is configured to determine a region to which an output value of the neural network model is classified as the target region being gazed at.

The associated painting obtainer 230 is configured to obtain at least one associated painting associated with the target region. In some embodiments, the associated painting obtainer 230 may be coupled to a painting database to retrieve associated paintings therefrom.

In some embodiments, the apparatus for obtaining a painting further includes: a target feature recognizer 250 configured to recognize at least one target feature in each region of the current painting, and an annotation information adder 260 configured to add annotation information for respective target features.

In some embodiments, the associated painting obtainer 230 is configured to retrieve, according to the annotation information of the target features in the target region, at least one associated painting corresponding to the annotation information from the painting database.

In some embodiments, the apparatus for obtaining a painting further includes a gaze duration determiner 270 configured to determine a duration during which the user gazes at the target region; and send an instruction to initiate the associated painting obtainer to obtain at least one associated painting associated with the target region in response to the duration being greater than the threshold duration. In some embodiments, the gaze duration determiner 270 is configured to for example receive from the image acquirer a sequence of face images of the user viewing the current painting acquired at a regular time interval, and determine the duration during which the user gazes at the target region according to the sequence of face images.

In some embodiments, the apparatus further includes a recommender 280 configured to recommend the at least one associated painting that is obtained to the user. In some embodiments, the recommender 280 may include a display or a speaker to recommend the associated painting to the user in a visual or audible manner. For example, the display may display the associated painting to the user or play information about the associated painting to the user, such as the name, painter and the exhibition position of the painting.

The apparatus for obtaining a painting according to the embodiments of the present disclosure obtains, based on a target region on the current painting that a user's eyes are gazing at, at least one painting associated with the target region, and recommends the at least one painting to the user, thereby enabling the painting recommendation to be better adapted to the user's current preferences or interests, increasing the accuracy of the painting recommendation and improving the user experience.

For ease of description, the aforesaid method embodiments are all described as a combination of a series of acts, but those skilled in the art would appreciate that the present disclosure is not limited to the described order of acts because some steps may be performed in other orders or simultaneously according to the present disclosure. Moreover, those skilled in the art would appreciate the embodiments described in the description all belong to optional embodiments, and the involved acts and modules are not necessarily required for the present disclosure.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Generally, any of the functions described herein can be implemented using software, firmware, hardware (e.g., fixed logic circuitry), manual processing, or a combination of these implementations. In the case of a software implementation, the functionality or logic represents program code that performs specified tasks when executed on or by a processor (e.g., CPU or CPUs). The program code can be stored in one or more computer readable memory devices. The features of the picture acquisition techniques according to the present disclosure are platform-independent, meaning that the techniques may be implemented on a variety of commercial computing platforms having a variety of processors.

The embodiments in the present specification are described in a progressive manner, and each embodiment focuses on differences from other embodiments, and the same or similar parts between the various embodiments may be referred to each other.

Finally, it should also be appreciated that in this context, relational terms such as first and second are used merely to distinguish one entity or operation from another entity or operation, and do not necessarily require or imply that there exists any such actual relationship or order between these entities or operations. Furthermore, the terms "comprise", "include" or any other variations are intended to cover a non-exclusive inclusion, such that a process, method, goods or device including a series of elements not only includes these elements, but also includes other elements not listed explicitly, or further includes elements intrinsic with the process, method, goods or devices. Without more limitations, an element defined in the sentence "comprising one . . . " does not exclude existence of other identical elements in the process, method, goods or device including the element.

The above describes in detail a method for acquiring painting and an apparatus for obtaining a painting provided by the present disclosure. The principles and implementations of the present disclosure are described herein by using specific examples. The description of the above embodiments is only intended to facilitate understanding of the method of the present disclosure and its core ideas; meanwhile, those skilled in the art appreciate that specific implementations and application scope all might change according to the ideas of the present disclosure. To conclude, the content of the specification should not be construed as limiting the present disclosure.

The invention claimed is:

1. A method for obtaining a painting, comprising:
receiving an acquired face image of a user who is viewing a current painting;
analyzing the received face image to determine a target region on the current painting that the user is gazing; and
obtaining at least one associated painting associated with the target region;
wherein the analyzing the received face image comprises analyzing the received face image based on a trained neural network model, and wherein before determining the target region on the current painting that the user is gazing, the method further comprises:
dividing a sample painting into at least one region;
receiving a plurality of acquired sample face images of respective ones of a plurality of sample users who gaze at the at least one region;
obtaining distance information of ones of the sample users relative to the sample painting corresponding to respective ones of the sample face images;
segmenting corresponding eye images including pupil information from the sample face images; and
training the neural network model by using the distance information and the eye images corresponding to respective sample face images as training data to input into the neural network model to obtain the trained neural network model,
wherein the sample face images comprise two face images simultaneously captured by a binocular camera, and
wherein the distance information is obtained by calculating a parallax of the two face images.

2. The method according to claim 1, wherein the current painting is divided into at least one region, and wherein before obtaining the at least one associated painting associated with the target region, the method further comprises:
recognizing at least one target feature in each of the at least one region; and
adding annotation information for respective target features of the at least one target feature in each region.

3. The method according to claim 2, wherein the obtaining at least one associated painting associated with the target region comprises:
retrieving, according to the annotation information of the target features in the target region, at least one associated painting corresponding to the annotation information from a painting database.

4. The method according to claim 1, wherein before obtaining the at least one associated painting associated with the target region, the method further comprises:
determining a duration during which the user gazes at the target region; and
sending an instruction to obtain the at least one associated painting associated with the target region, in response to the duration being greater than a threshold duration.

5. The method according to claim 4, wherein the determining the duration during which the user gazes at the target region comprises:
acquiring a sequence of face images of the user who is viewing the current painting at a regular time interval, and
determining the duration during which the user gazes at the target region according to the sequence of face images.

6. The method according to claim 1, wherein the at least one associated painting that is obtained is recommended to the user in a user-perceptible manner.

7. A non-transitory computer-readable storage medium on which a computer program is stored, the computer program, when executed by a processor, causing the processor to implement operations of the method according to claim 1.

8. The non-transitory computer-readable storage medium according to claim 7, wherein the current painting is divided into the at least one region, and wherein before obtaining the at least one associated painting associated with the target region, the method further comprises:
recognizing at least one target feature in each of the at the least one region; and
adding annotation information for respective target features of the at least one target feature in each region.

9. The non-transitory computer-readable storage medium according to claim 8, wherein the obtaining at least one associated painting associated with the target region comprises:
retrieving, according to the annotation information of the target features in the target region, at least one associated painting corresponding to the annotation information from a painting database.

10. The non-transitory computer-readable storage medium according to claim 7, wherein before obtaining the at least one associated painting associated with the target region, the method further comprises:
determining a duration during which the user gazes at the target region; and
sending an instruction to obtain the at least one associated painting associated with the target region, in response to the duration being greater than a threshold duration.

11. A computer device, comprising a memory, a processor and a computer program stored on the memory and configured to run on the processor,
wherein the processor, upon executing the computer program, implements operations of the method according to claim 1.

12. The computer device according to claim 11, wherein the current painting is divided into the at least one region, and wherein before obtaining the at least one associated painting associated with the target region, the method further comprises:
recognizing at least one target feature in each of the at least one region; and
adding annotation information for respective target features of the at least one target feature in each region.

13. The computer device according to claim 12, wherein the obtaining at least one associated painting associated with the target region comprises:
retrieving, according to the annotation information of the target features in the target region, at least one associated painting corresponding to the annotation information from a painting database.

14. The computer device according to claim 11, wherein before obtaining the at least one associated painting associated with the target region, the method further comprises:

determining a duration during which the user gazes at the target region; and sending an instruction to obtain the at least one associated painting associated with the target region, in response to the duration being greater than a threshold duration.

15. A apparatus for obtaining a painting, comprising:

an image acquirer configured to acquire a face image of a user who is viewing a current painting;

a target region determiner configured to receive and analyze the face image to determine a target region on the current painting that the user is gazing; and an associated painting obtainer configured to obtain at least one associated painting associated with the target region, wherein the apparatus further comprises a region divider configured to divide the current painting into at least one region, wherein the image acquirer is configured to acquire a plurality of sample face images of a plurality of sample users who gaze at the at least one region, and wherein the target region determiner is configured to analyze the received face image based on a trained neural network model, wherein the neural network model is trained by obtaining distance information of ones of the sample users relative to the sample painting corresponding to respective ones of the sample face images, segmenting eye images including pupil information from the sample face images, and using the distance information and the eye images corresponding to respective sample face images as training data to input into the neural network model to obtain the trained neural network model, wherein the image acquirer comprises a binocular camera configured to capture two face images simultaneously, and wherein the target region determiner is configured to obtain the distance information by calculating a parallax of the two face images.

16. The apparatus according to claim 15, further comprising:

a region divider configured to divide the current painting into the at least one region;

a target feature recognizer configured to recognize at least one target feature in a respective region of the current painting; and an annotation information adder configured to add annotation information for respective ones of the at least one target feature.

17. The apparatus according to claim 16, wherein the associated painting obtainer is further configured to retrieve, according to the annotation information of the at least one target feature in the target region, at least one associated painting associated with the target region from a painting database.

18. The apparatus according to claim 15, further comprising:

a gaze duration determiner configured to determine a duration during which the user gazes at the target region, and configured to send an instruction to initiate the associated painting obtainer to obtain the at least one associated painting associated with the target region in response to the duration being greater than a threshold duration.

19. The apparatus according to claim 18, wherein the gaze duration determiner is further configured to receive from the image acquirer a sequence of face images of the user that is viewing the current painting acquired at a regular time interval, and configured to determine the duration during which the user gazes at the target region according to the sequence of face images.

20. The apparatus according to claim 15, further comprising:

a recommender configured to recommend the at least one associated painting that is obtained to the user in a user-perceptible manner.

* * * * *